United States Patent
Fujisawa

(10) Patent No.: US 8,752,076 B2
(45) Date of Patent: Jun. 10, 2014

(54) DISK DEVICE

(75) Inventor: Shinichi Fujisawa, Akiruno (JP)

(73) Assignee: TEAC Corporation, Tama-shi, Tokyo (JP)

(*) Notice: Subject to any disclaimer, the term of this patent is extended or adjusted under 35 U.S.C. 154(b) by 1541 days.

(21) Appl. No.: 12/050,095

(22) Filed: Mar. 17, 2008

(65) Prior Publication Data

US 2009/0031332 A1    Jan. 29, 2009

(30) Foreign Application Priority Data

Jul. 23, 2007 (JP) ................................ 2007-191384

(51) Int. Cl.
*G11B 17/04* (2006.01)
(52) U.S. Cl.
USPC .......................................... 720/622; 720/623
(58) Field of Classification Search
USPC ................................................ 720/622–623
See application file for complete search history.

(56) References Cited

U.S. PATENT DOCUMENTS

| | | | |
|---|---|---|---|
| 6,704,266 B2 | 3/2004 | Yanagiguchi | |
| 7,966,628 B2 * | 6/2011 | Omori et al. | 720/623 |
| 2006/0230412 A1 * | 10/2006 | Fujisawa et al. | 720/626 |

FOREIGN PATENT DOCUMENTS

| | | |
|---|---|---|
| JP | 11-185338 A | 7/1999 |
| JP | 2002-237119 A | 8/2002 |
| JP | 2005-135508 A | 5/2005 |
| JP | 2006-228353 A | 8/2006 |

* cited by examiner

*Primary Examiner* — Wayne Young
*Assistant Examiner* — Carlos E Garcia
(74) *Attorney, Agent, or Firm* — Seed IP Law Group PLLC

(57) ABSTRACT

A lift frame supports a turntable unit, and moves between a lower-most position and a read/write position in conjunction with slide movement of a follower slider. The follower slider has a pressing member and a cam groove. Pressed to a bottom plate of a device chassis by a coil spring, the pressing member stabilizes the movement of the follower slider. The cam groove fits onto a lifting pin of the lift frame. At the read/write position, the cam bottom wall is constituted of a pin pushing portion. The pin pushing portion is pushed upward by the coil spring to press the lifting pin to a cam groove upper wall when the lift frame is in the read/write position.

8 Claims, 10 Drawing Sheets

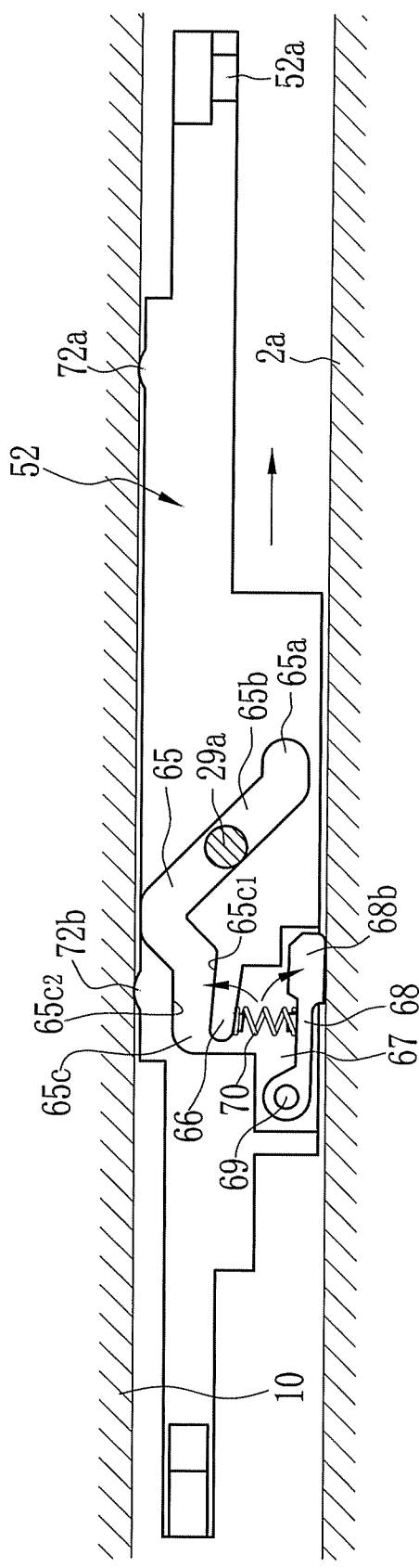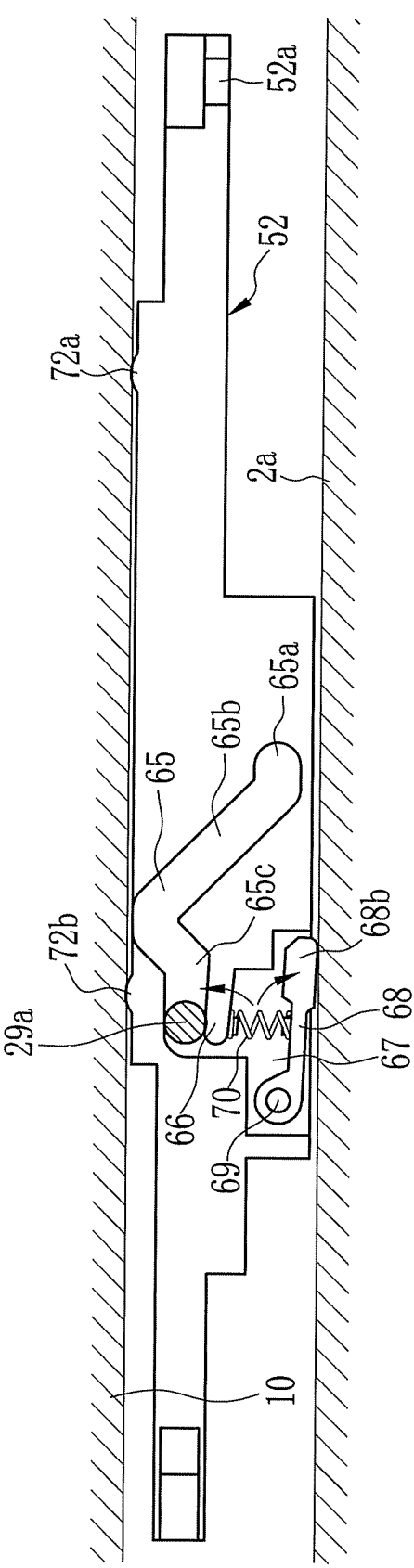

DISK DEVICE

FIELD OF THE INVENTION

The present invention relates to a disk device that drives an optical disk to read/write data, and more particularly to a disk device with a lifting mechanism to move up and down a lift frame that supports a turntable to hold and rotate the disk.

BACKGROUND OF THE INVENTION

Computer systems and other information devices store data to optical disks (such as CDs and DVDs) which have a decent memory capacity. The optical disk (hereinafter, disk) is loaded in a disk device for data reading and writing. Generally, the disk devices are classified into tray type and slot-in type.

The tray type devices are equipped with a disk tray that moves between a loading position where it rests in a chassis and an eject position where it projects from the chassis (see, for example, Japanese Patent Laid-open Publications No. 11-185338, No. 2005-135508 and No. 2002-237119 corresponding to U.S. Pat. No. 6,704,266). When a disk is set in the disk tray at the eject position and an operate button, for example, is pressed, a loading motor starts working to pull the disk tray into the loading position. Then, a slider moves and lifts a lift frame, which supports a turntable unit and a pick-up unit, composing a traverse unit as a whole. During uplift of the lift frame, the disk is attached to a clamp head of the turntable unit. The lift frame is further lifted to a read/write position, and the turntable starts rotating the disk. The pick-up unit reads or writes data to the rotating disk. When the operation button is pressed again, the slider moves in the opposite direction from when the disk is loaded to bring down the lift frame to a lower-most position, and the disk tray is pushed out to the eject position.

The slot-in type devices have a bezel with a slot on a front surface of a chassis (see, for example, Japanese Patent Laid-open Publication No. 2006-228353 corresponding to U.S. Patent Application Publication No. 2006/0230412 A1). A disk to be loaded is inserted to the slot of the bezel. When the disk rim touches a disk loading mechanism, a loading motor starts to activate the disk loading mechanism, and the disk is pulled into the chassis. Then, the slider moves and lifts the lift frame. The lift frame moves from a lower-most position to an upper-most position and attaches the disk to a chucking head of the turntable unit. The lift frame is then slightly brought down to a read/write position, and the turntable unit starts rotating the disk to enable reading or writing data. When an eject button is pressed, the slider moves in the opposite direction from when the disk is loaded to bring down the lift frame to a lower-most position, and the disk loading mechanism carries the disk out of the chassis.

In either type, the slider and the lift frame are connected to each other through a cam groove of the slider and a lifting pin of the lift frame that fits into the cam groove. When the disk is loaded, the slider moves to lift the lift frame from the lower-most position to the read/write position. To facilitate sliding of the slider, a small gap is created between the slider and a slide surface (for example, a bottom plate of the chassis). This gap, however, makes the slider somewhat bumpy during the slide motion, and causes unstable movement of the slider.

A small gap is also created between lifting pin and the cam groove, so that the lifting pin can slide smoothly in the cam groove. However, if the disk device is subject to vibration or impact while the disk is being rotated by the turntable unit on the lift frame at the read/write position, the lift frame vibrates up and down in the gap, possibly resulting in read/write error of the data.

SUMMARY OF THE INVENTION

In view of the foregoing, a main object of the present invention is to provide a disk device capable of stabilizing movement of a slider.

Another object of the present invention is to provide a disk device capable of preventing a lift frame from vibrating up and down during data read/write operations.

In order to achieve the above and other objects, a disk device according to the present invention includes a pressing member provided on a slider and a spring to press the pressing member to a face of slide. The slider has a cam groove and slides on the face of slide. This cam groove fits onto a lifting pin of a lift frame supporting a turntable. The slide movement of the slider leads to lift the lift frame from a lower-most position so as to attach a disk to a turntable, and then put the lift frame in a read/write position.

In a preferred embodiment of the present invention, the face of slide is a bottom plate of a device chassis. Additionally, a cam wall of the cam groove in the area where the lift frame is put in the read/write position is constituted of a resilient pin pushing portion, which is biased by the spring to press the lifting pin to an opposite cam wall of the cam groove. The spring is located between the pin pushing portion and the pressing member.

It is preferred to attach the pressing member rotatably to the slider. In this case, the pressing member has a plate-like shape with a shaft hole, which rotatably fits onto a shaft formed on the slider.

In another preferred embodiment of the present invention, the pressing member is a projection having an L-shaped cross section and is integrated with the slider.

In still another preferred embodiment of the present invention, the pressing member moves up and down with respect to the slider. This pressing member includes a columnar portion and a retaining flange on the columnar portion, and the columnar portion projects from an opening on a bottom of the slider.

According to the present invention, the pressing member on the slider is always pressed to a slide surface by a biasing force of the spring, and the movement of the slider is therefore stabilized.

Additionally, the pin pushing portion presses the lifting pin onto the cam groove surface, and the gap between the lifting pin and the cam groove is therefore closed when the lift frame is at the read/write position. This prevents the lift frame from vibrating even if the disk device gets vibration or impact at the read/write position. It is further possible to hold the lift frame at a certain height in the read/write position.

BRIEF DESCRIPTION OF THE DRAWINGS

The above objects and advantages of the present invention will become more apparent from the following detailed description when read in connection with the accompanying drawings, in which:

FIG. 9A and FIG. 9B are explanatory views illustrating operation of a cam groove of the follower slider;

DETAILED DESCRIPTION OF THE PREFERRED EMBODIMENTS

Figure 1:
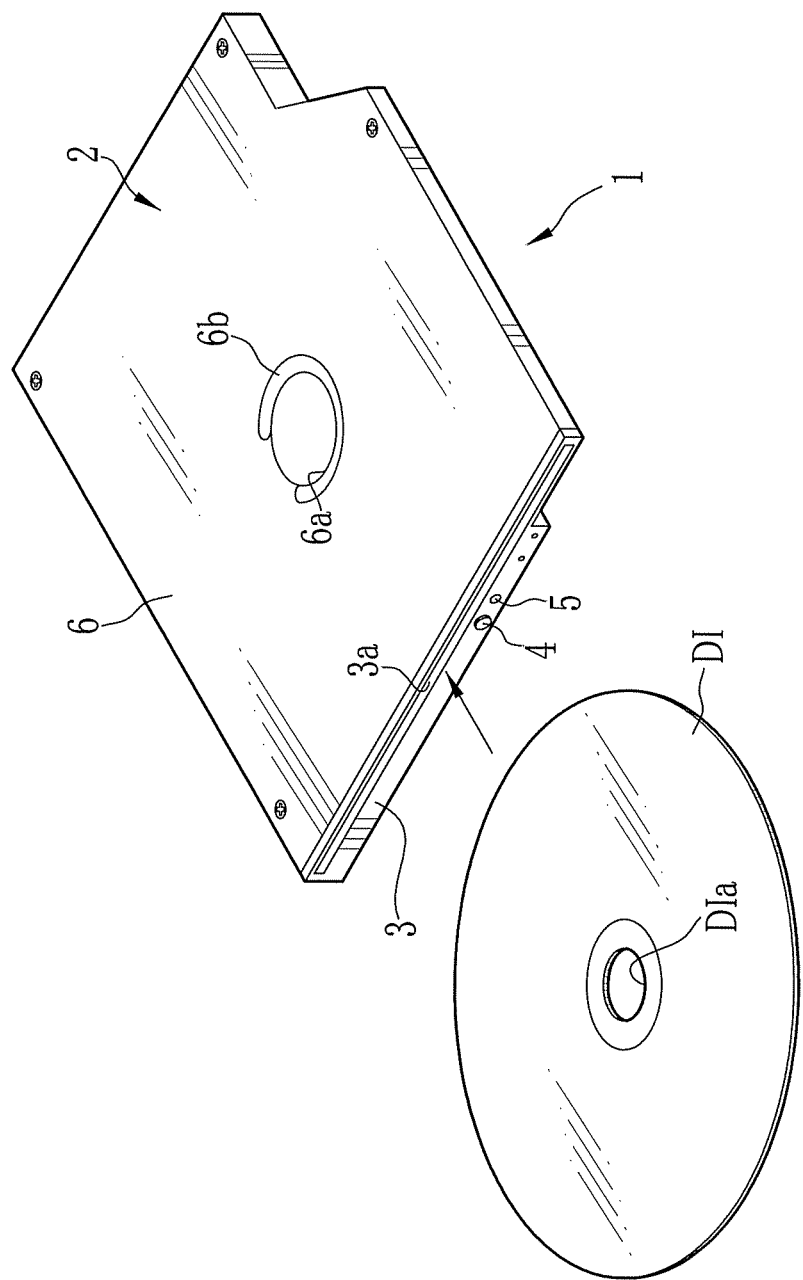
FIG. 1 is a perspective view of a disk device according to the present invention.

Referring to FIG. 1, a disk device 1 has an enclosed chassis 2, and a bezel 3 is attached to a front face of the chassis 2. The bezel 3 is provided with a slot 3a to which a disk DI is inserted, a push button 4 to eject the disk DI and an indicator 5 to show an operating state of the disk device 1.

The chassis 2 also includes a top plate 6. Formed in the center of the top plate 6 is an opening 6a in which a tip of a chucking head 16 (see FIG. 2) enters to chuck the disk DI. Around the opening 6a, a recess 6b is formed to project from an interior wall of the chassis 2. This projection on the interior wall receives the disk DI when the chucking head 16 fits into a central hole DIa of the disk DI.

Figure 2:
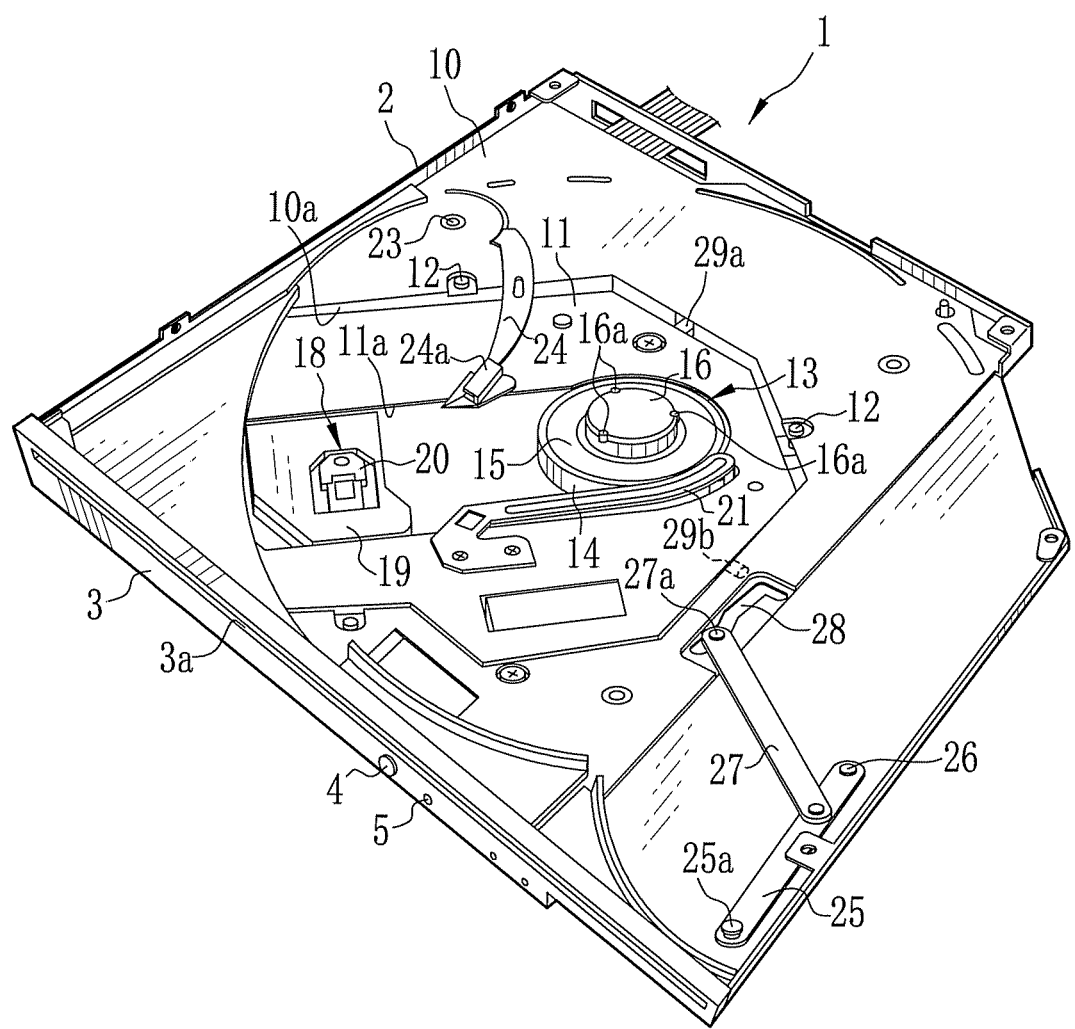
FIG. 2 is a perspective view of the disk device without a top plate.
Figure 3:
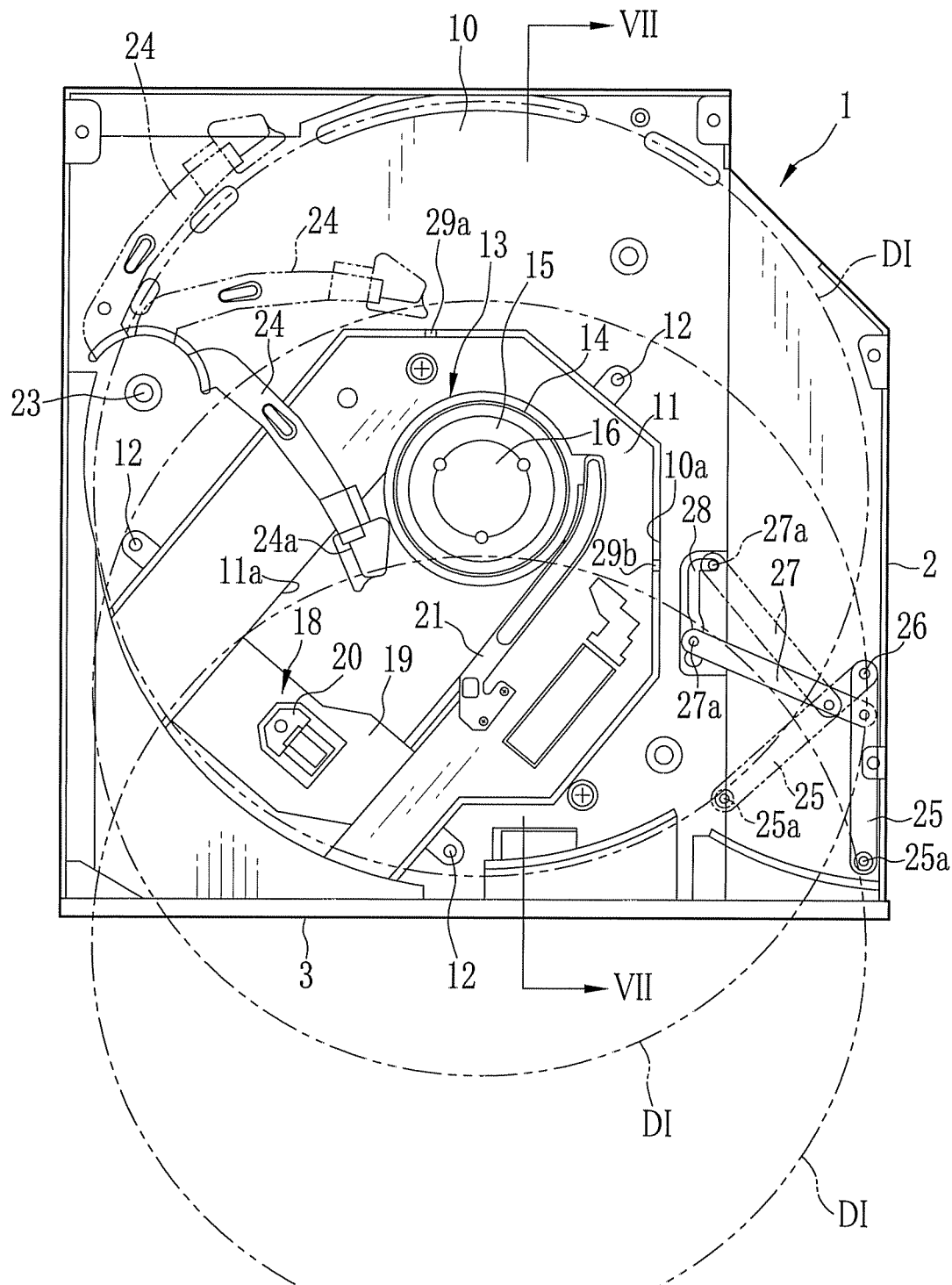
FIG. 3 is a plan view of the disk device without the top plate.

In FIG. 2 and FIG. 3, a base panel 10 is attached to the chassis 2 and vertically divides the space inside the chassis 2. The base panel 10 has an opening 10a that extends diagonally from the center toward the bezel 3. Inside the opening 10a, a lift frame 11 is located. Similar to the base panel 10, the lift frame 11 has an opening 11a diagonally extending from the center.

Figure 8A:
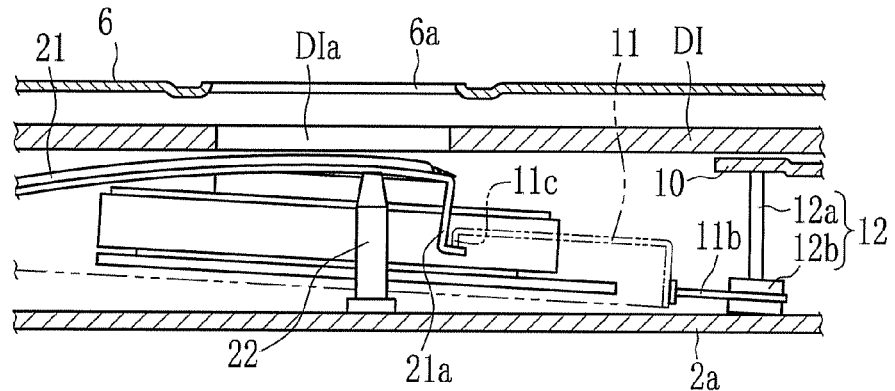
FIG. 8A to FIG. 8D are cross section views illustrating a disk chucking operation.

The lift frame 11 is supported on the bezel 3 side and swung up and down on the opposite tip side so as to carry the disk DI in and out of the chassis 2. To reduce impact during this lifting motion, the lift frame 11 is attached at multiple points to the base panel 10 by a shock-absorbing support structure 12. As shown in FIG. 8A, the shock-absorbing support structure 12 includes a shaft 12a upstanding between the base panel 10 and a bottom plate 2a of the chassis 2, and a rubber ring 12b around the shaft 12a. The rubber ring 12b is fixed to a projection 11b that projects from the lift frame 11.

Referring back to FIG. 3, a turntable unit 13 is attached on the tip side of the lift frame 11. The turntable unit 13 includes a spindle motor 14, a turntable 15 and the chucking head 16. The spindle motor 14 is fixed to an inner surface of the lift frame 11, and a drive shaft thereof is fixed to the turntable 15. The chucking head 16 is integrated with the turntable 15. The chucking head 16 chucks the disk DI that is lifted to a chucking position by the lift frame 11. Additionally, the chucking head 16 has several spring-loaded chucking jaws 16a to detachably hold the disk DI.

Also to the lift frame 11, a pick-up unit 18 is attached. The pick-up unit 18 includes a carriage 19 on the bezel 3 side in the opening 11a and an optical pickup 20 on the carriage 19. To read and write data, the carriage 19 moves in a radial direction of the disk DI along the opening 11a.

Attached also to the lift frame 11 is a disk guide piece 21 that guides a bottom surface of the disk DI. The disk guide piece 21 extends, along a carry-in (loading) direction of the disk DI, to the side of the turntable 15. The disk guide piece 21 gradually slopes upward toward the tip, so that the disk DI can climb this slope to avoid hitting the chucking head 16 during the loading operation.

As shown in FIG. 8A, below the tip portion of the disk guide piece 21 is disposed a chuck release pin 22, which makes contact with the disk guide piece 21 when the lift frame 11 descends so as to keep the disk guide piece 21 and the disk DI at a certain heights. Accordingly, the disk DI is released (detached) from the chucking head 16 as the lift frame 11 descends. Further, the tip of the disk guide piece 21 is formed into a downward-oriented bent portion 21a. When the lift frame 11 reaches the lower-most position, the bent portion 21a is pressed down by a bent edge portion 11c of the lift frame 11, and the slope of the disk guide piece 21 is then curved upward.

As shown in FIG. 2 and FIG. 3, a disk supporting arm 24 to carry in and out the disk DI and a drawing arm 25 to pull the disk DI, inserted from the slot 3a, into the chassis 2 are pivotally attached on the base panel 10. The disk supporting arm 24 holds an anterior rim of the disk DI with a holder 24a and rotates on a pivot 23. The drawing arm 25 holds a posterior rim of the disk DI with a flanged roller 25a and rotates on a pivot 26. The drawing arm 25 is connected to a link lever 27, which has a cam pin 27a that slides along a guide slit 28 to rotate the drawing arm 25.

Note that FIG. 3 shows the disk DI at three positions, the eject position, an auto-loading start position and the chucking position. Also note that reference numerals 29a, 29b are lifting pins to move up and down the lift frame 11.

Figure 4:
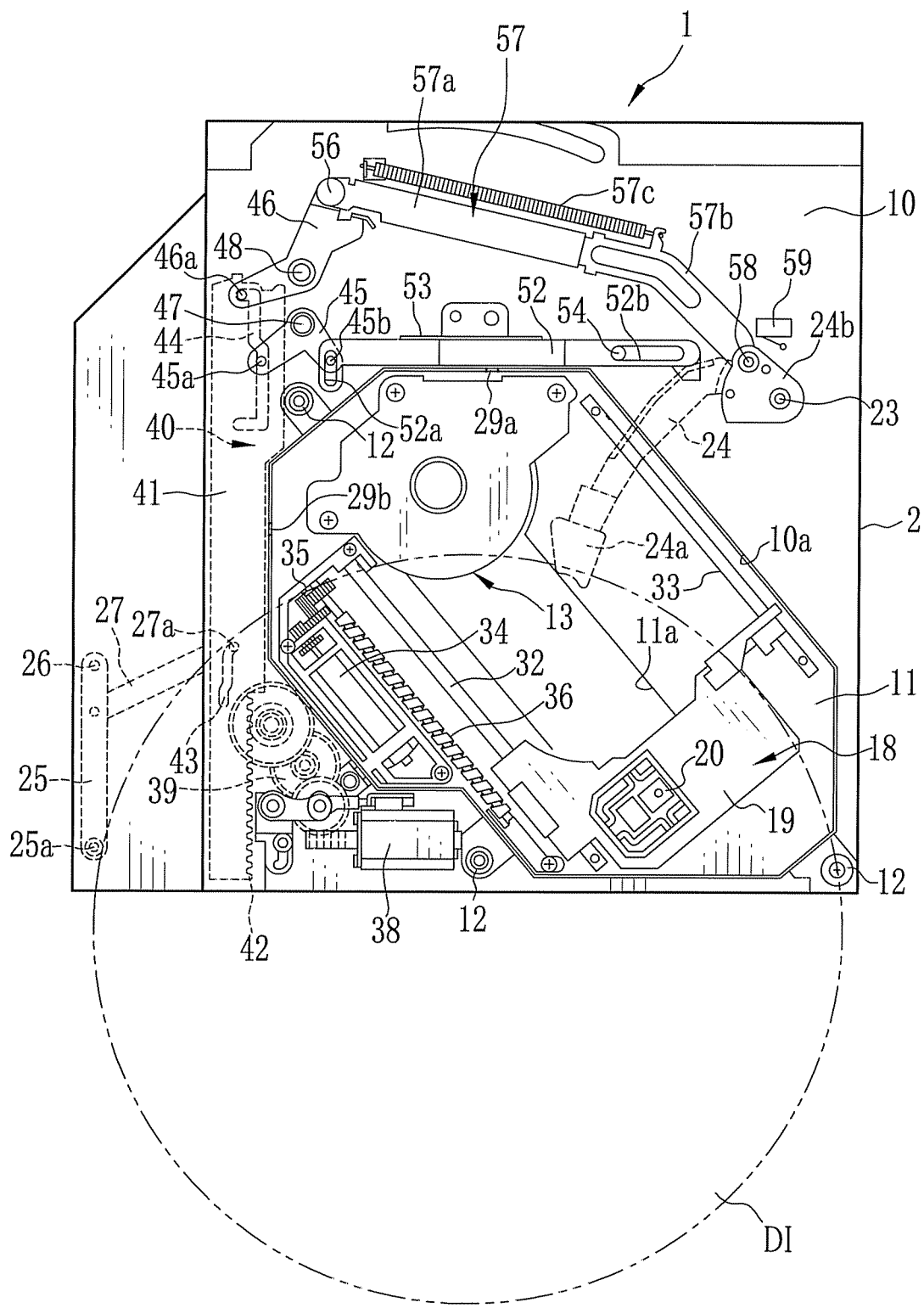
FIG. 4 is a bottom view of the disk device in which a bottom plate is partially omitted.

In FIG. 4, the carriage 19 that holds the optical pickup 20 is supported between a pair of guide shafts 32, 33. Each of the guide shafts 32, 33 is fixed on both ends to a bottom surface of the lift frame 11. Rotation of a thread motor 34 is transmitted through a gear train 35 to a screw shaft 36, which rotates to move the carriage 19 forward and backward.

On the bottom surface of the lift frame 11, a loading motor 38 is disposed. Rotation of the loading motor 38 is transmitted through a gear train 39 to a disk loading mechanism 40, and the disk DI is thus carried in and out. The disk loading mechanism 40 is mainly composed of a loading slider 41, the disk supporting arm 24 and the drawing arm 25.

The loading slider 41 has a rack gear 42 on one end to engage with a driven gear of the gear train 39, and moves forward and backward along a side wall of the chassis 2 in response to the rotation of the loading motor 38. The disk DI is carried in to the chassis 2 as the loading slider 41 moves forward (away from the bezel 3), and carried out of the chassis 2 as the loading slider 41 moves backward.

The loading slider 41 also has cam grooves 43, 44. The cam groove 43 is overlapped by the guide slit 28, and they fit onto the cam pin 27a of the link lever 27 (see, FIG. 5). As the loading slider 41 moves forward/backward, the link lever 27 moves along the cam groove 43 and the guide slit 28. The cam groove 44 fits onto cam pins 45a, 46a of link levers 45, 46. As the loading slider 41 moves forward/backward, the link levers 45, 46 rotate on pivots 47, 48.

The link lever 45 also has a cam pin 45b, which fits into a long hole 52a of a follower slider 52. The follower slider 52 is moved in horizontal directions of the drawings by a guide hole 52b at one end and a pin 54 that fits into the guide hole 52b. The follower slider 52 is guided on the rear surface by a guide plate 53 fixed to the base panel 10.

The link lever 46 is connected through a pin 56 to a link arm 57, which is connected through a pin 58 to a base piece 24b. The base piece 24b is integrated with the disk supporting arm 24 on the top surface of the base panel 10, and rotates on the pivot 23. Nearby the base piece 24b is disposed a switch 59 that turns on when the disk supporting arm 24 is rotated by a predetermined amount by the inserted disk DI. Receiving a signal from the switch 59, a control circuit (not shown) activates the loading motor 38 to start the disk loading mechanism 40 that automatically carries the disk DI in.

The link arm 57 includes a first arm 57a, a second arm 57b slidably connected to the first arm 57a, and a spring 57c to keep the link arm 57 in the shortest length. This expandable link arm 57 allows rotating the disk supporting arm 24 without moving the link lever 46 while the disk DI is pushed into the chassis 2 by the user, in other words, until the disk loading mechanism 40 starts the auto-loading operation.

Figure 5:
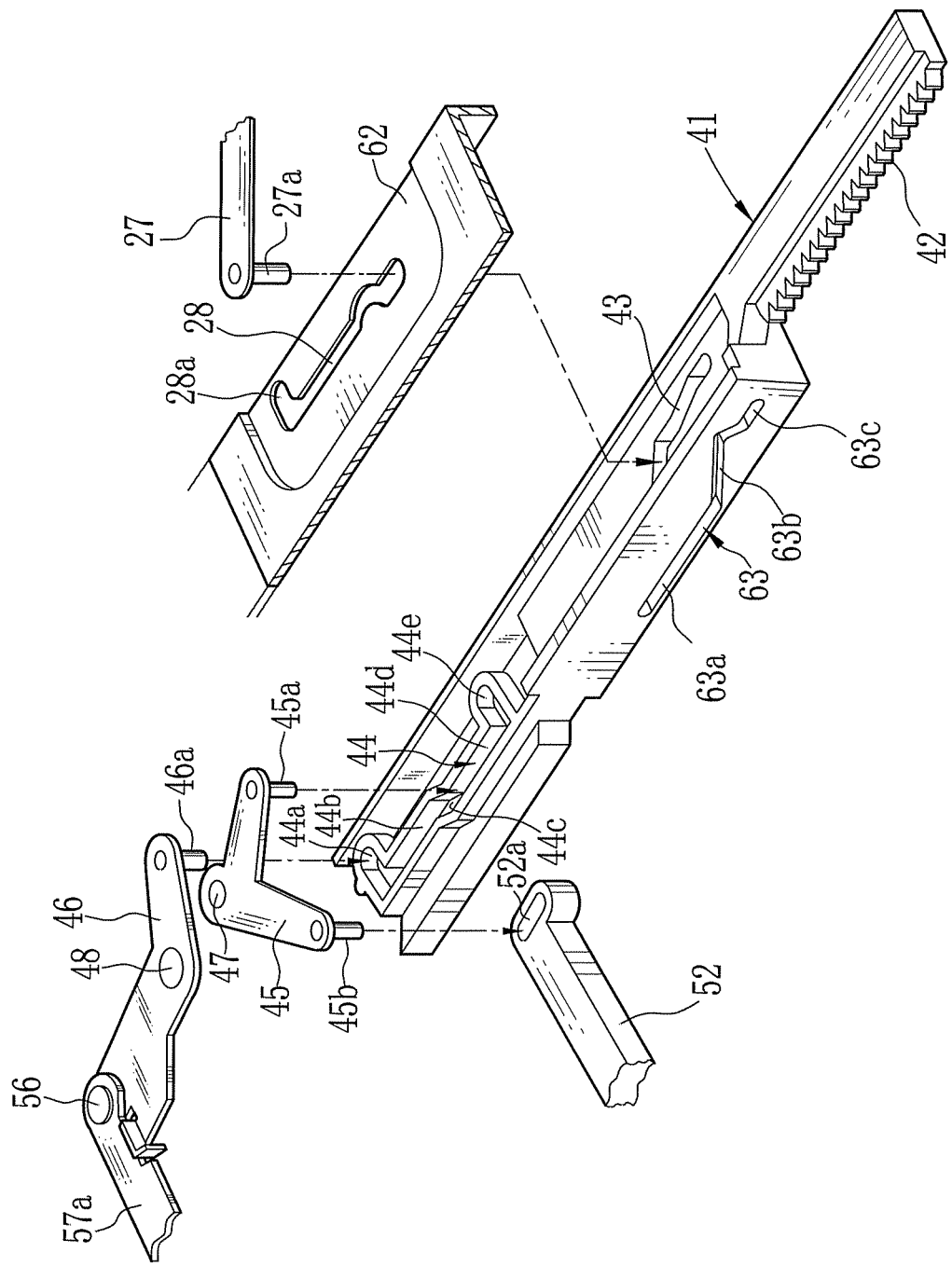
FIG. 5 is a perspective view of a loading slider and link levers that engage with the loading slider.

As shown in FIG. 5, the loading slider 41 has a rod-like shape and slides between a guide plate 62 and the bottom plate 2a of the chassis 2. The guide plate 62 is fixed to the base panel 10, and has the above-described guide slit 28. The rack gear 42 and the cam grooves 43, 44 all described above are formed in the loading slider 41.

The cam groove 44 includes horizontal groove portions 44a, 44e, a vertical groove portion 44b and a slant portion 44c. Before the disk load, the cam pin 46a of the link lever 46 is in the horizontal groove portion 44a, while the cam pin 45a of the link lever 45 is in the vertical groove portion 44d.

The loading slider 41 further has a cam groove 63 on the lateral side facing the lift frame 11, and the lifting pin 29b of the lift frame 11 fits into this cam groove 63. The cam groove 63 includes a lower portion 63a to put the lift frame 11 in the lower-most position, a slant portion 63b to move the lift frame 11 up or down, and a higher portion 63c to put the lift frame 11 in the read/write position.

Figure 6:
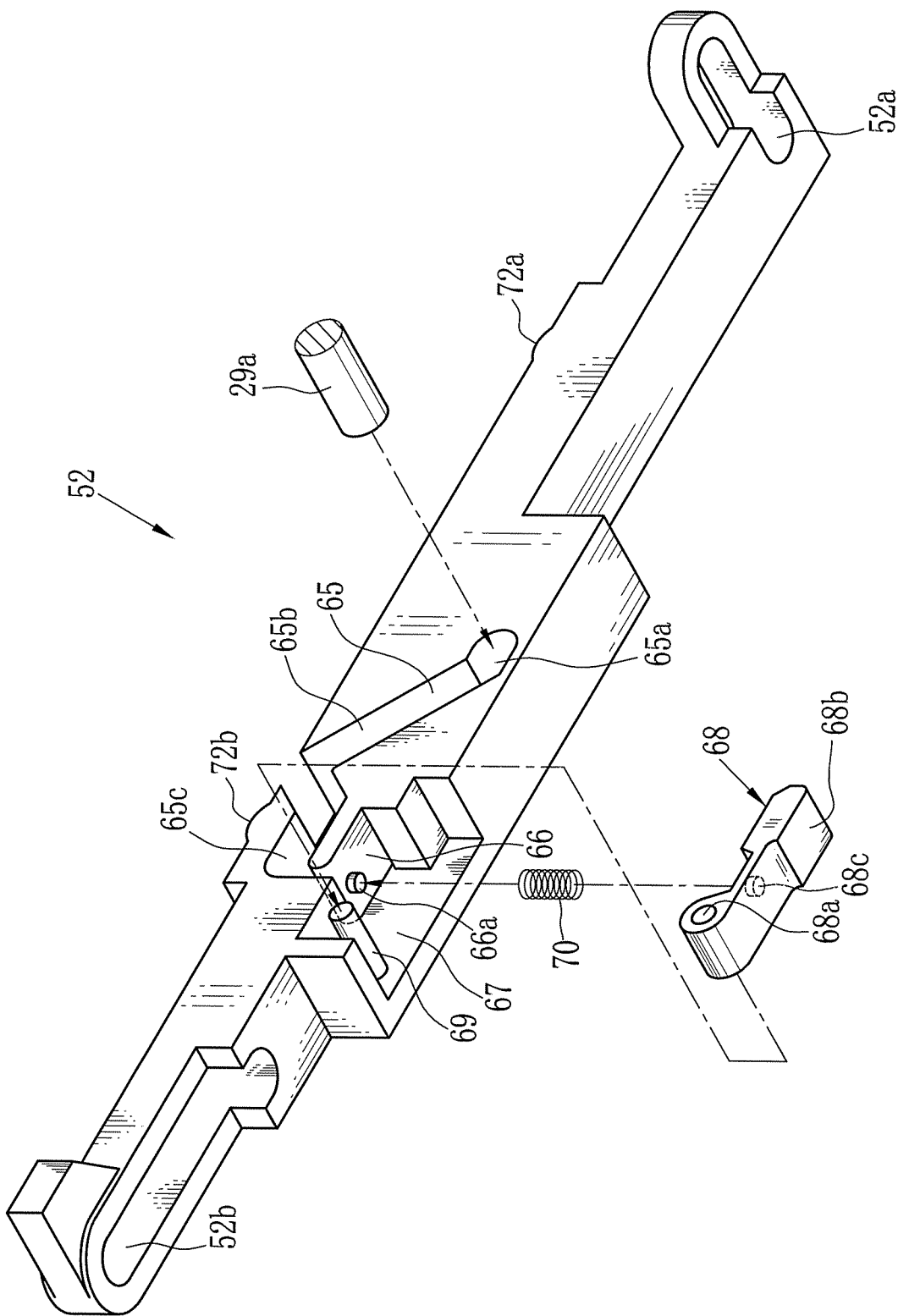
FIG. 6 is a lower perspective view of a follower slider.

As shown in FIG. 6, the follower slider 52 has a cam groove 65 into which the lifting pin 29a of the lift frame 11 fits. Similar to the cam groove 63 of the loading slider 41, the cam groove 65 includes a lower portion 65a to put the lift frame 11 in the lower-most position, a slant portion 65b to move the lift frame 11 up or down, and a higher portion 65c to put the lift frame 11 in the read/write position.

To achieve smooth up/down movement of the lift frame 11, the cam groove 65 is made slightly wider than the lifting pin 29a. The resultant gap between the cam groove 65 and the lifting pin 29a, however, causes displacement of the lift frame 11 or jerk of the lift frame 11 when the disk device 1 is get vibrated or impacted. Therefore, to close the gap at the higher portion 65c, a pin pushing portion 66 of plate-like shape is formed in the cam groove 65. As shown in FIG. 9A, a top surface of the pin pushing portion 66 is a cam groove bottom wall $65c_1$, and composes the higher portion 65c together with a cam groove top wall $65c_2$ formed in the follower slider 52.

Underneath the pin pushing portion 66 is formed a cutout 67. In the cutout 67, a pin 69 is formed to rotatably support a pressing member 68. The pressing member 68 includes a shaft hole 68a to fit onto the pin 69, a pressing portion 68b slightly projecting downward, and a boss 68c. The pressing portion 68b resides in the front end of the pressing member 68 and slides on the bottom plate 2a.

A coil spring 70 is disposed between the pin pushing portion 66 and the pressing member 68, and is fitted at each end to a boss 66a on a bottom surface of the pin pushing portion 66 and the boss 68c of the pressing member 68 respectively, such that it does not come off from between the bosses 66a, 68c. The coil spring 70 pushes upward the pin pushing portion 66 so as to press the lifting pin 29a to the cam groove top wall $65c_2$.

Also, the coil spring 70 pushes downward the pressing member 68 so as to press the pressing portion 68b to the bottom plate 2a. This effect stabilizes the follower slider 52 when sliding on the bottom plate 2a. Note that there are projections 72a, 72b on a top surface of the follower slider 52 to reduce area of contact to the base panel 10.

Figure 7:
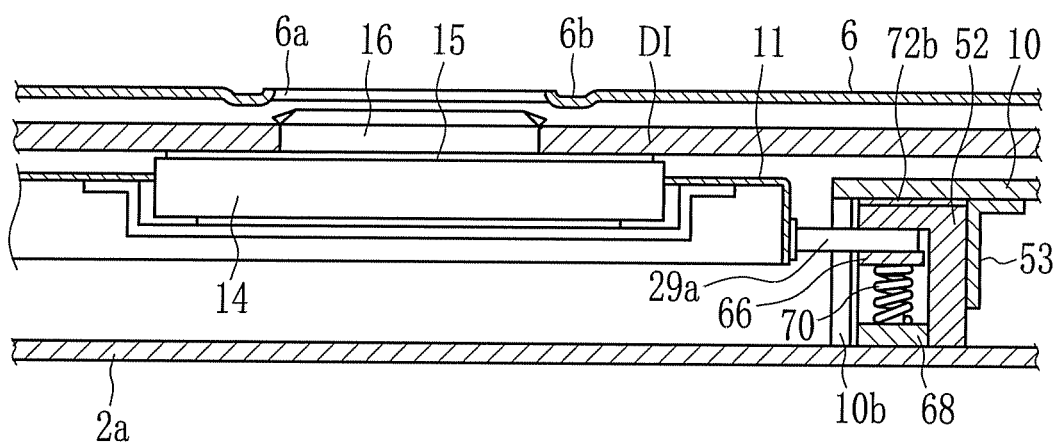
FIG. 7 is a cross section view of a turntable unit along a VII-VII line of FIG. 3.

As shown in FIG. 7, the follower slider 52 is guided at the front and the rear by a side wall 10b of the base panel 10 and the guide plate 53.

Hereinafter, with reference to FIG. 8 and FIG. 9, the operation of the above configuration is explained. Before the disk load, the lift frame 11 is set in the lower-most position as shown in FIG. 8A. In this state, the lifting pin 29a of the lift frame 11 is in the lower portion 65a of the cam groove 65 in the follower slider 52, and the lifting pin 29b is in the lower portion 63a of the cam groove 63 in the loading slider 41. Additionally, the disk guide piece 21 is curved upward because it is in contact with the chuck release pin 22 and pushed down by the bent edge portion 11c of the lift frame 11.

As shown in FIG. 3 and FIG. 4, when the disk DI is inserted to the chassis 2 from the slot 3a of the bezel 3, the anterior rim of the disk DI is supported by the holder 24a of the disk supporting arm 24. As the disk DI advances, the disk supporting arm 24 rotates on the pivot 23 in the counter-clockwise direction of FIG. 3, while elongates the link arm 57. In this instance, the anterior rim of the disk DI is raised on the disk guide piece 21 to cross over the chucking head 16 without hitting it.

When the disk DI is further pushed and the holder 24a of the disk supporting arm 24 passes through the lift frame 11, the base piece 24b turns on the switch 59. Receiving a signal from the switch 59, the loading motor 38 rotates to start the disk loading mechanism 40 that automatically carries the disk DI in.

Rotation of the loading motor 38 is transmitted through the gear train 39 to the loading slider 41, which moves in the forward direction (away from the bezel 3) accordingly. As the loading slider 41 moves forward, the cam groove 43 pushes the cam pin 27a of the link lever 27 along the guide slit 28. The link lever 27 is therefore moved to rotate the drawing arm 25 on the pivot 26 in the clockwise direction of FIG. 3. The drawing arm 25 pushes the posterior rim of the disk DI with the flanged roller 25a at the tip.

The loading slider 41 also turns the link lever 46 in the clockwise direction of FIG. 4 by means of the horizontal groove portion 44a of the cam groove 44. Rotation of the link lever 46 is transmitted through the link arm 57 to the base piece 24b, which then turns the disk supporting arm 24 in the counter-clockwise direction of FIG. 3. Accordingly, the disk DI is held between the disk supporting arm 24 and the drawing arm 25, and carried into the chassis 2.

As shown in FIG. 3, when the disk DI reaches the chucking position, the central hole DIa of the disk DI coincides with the chucking head 16. In the chucking position, the cam pin 27a of the link lever 27 is in the vertical groove portions of the cam groove 43 and the guide slit 28, and the drawing arm 25 is therefore suspended even when the loading slider 41 moves forward. Similarly, the disk supporting arm 24 is suspended because the cam pin 46a of the link lever 46 is in the vertical groove portion 44b.

The cam pin 45a of the link lever 45, on the other hand, is in the horizontal groove portion 44e, and the cam pin 45b and the long hole 52a cause the follower slider 52 to rotate in the left direction of FIG. 4 when the loading slider 41 moves forward. While it is guided by the side wall 10b of the base panel 10 and the guide plate 53, the follower slider 52 slides on the bottom plate 2a with the projections 72a, 72b being in contact with the bottom surface of the base panel 10. During the slide, the pressing portion 68b of the pressing member 68 is kept pressed to the bottom plate 2a by the coil spring 70 to close the gap between the follower slider 52 and the bottom plate 2a, and therefore the slide movement of the follower slider 52 is stabilized.

As described above, when the disk DI comes at the chucking position, the lifting pins 29a, 29b of the lift frame 11 reach the cam groove 65 of the follower slider 52 and the cam groove 63 of the loading slider 41 respectively. Then, the follower slider 52 starts sliding in conjunction with the loading slider 41 while the disk supporting arm 24 and the drawing arm 25 are suspended. This causes the lifting pins 29a, 29b to move along the slant portions 65b, 63b respectively, as shown in FIG. 9A, and the lift frame 11 starts ascending from the lower-most position to the read/write position.

Figure 8B:
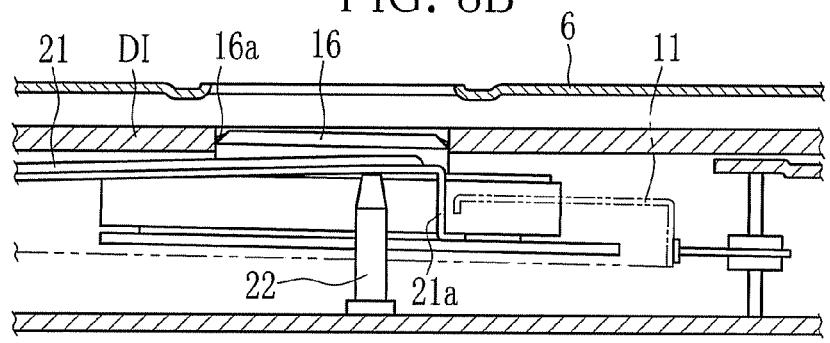
Figure 8C:
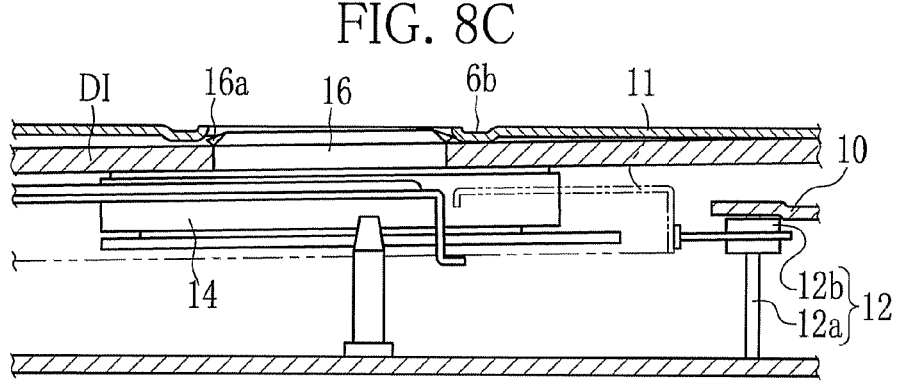

As shown in FIG. 8B, when the lift frame 11 starts ascending, the chucking head 16 enters the central hole DIa of the disk DI, which is then caught between the chucking jaws 16a. When the lift frame 11 further ascends, as shown in FIG. 8C, the disk DI is received by the projection made by the recess 6b on the top plate 6. When the lift frame 11 ascends slightly from this position, the chucking head 16 fits tightly into the central hole DIa and is fastened by the chucking jaws 16a. At this point when the chucking completes, the lifting pins 29a, 29b are in the highest portions of the cam groove 65, 63, and the lift frame 11 is in the upper-most position.

When the loading slider 41 and the follower slider 52 move after the chucking, the lifting pin 29a moves from the highest portion to the leveled higher portion 65c via the slant portion 65b, and the lifting pin 29a also moves from the highest portion to the leveled higher portion 63c via the slant portion 63b. Therefore, as shown in FIG. 8D, the lift frame 11 is put in the read/write position slightly lower than the upper-most position.

While the lift frame 11 is moving from the upper-most position to the read/write position, the cam pin 27a is pushed by the cam groove 43 to move along the horizontal groove portion 28a of the guide slit 28. This rotates the drawing arm 25 on the pivot 26 in the counter-clock direction of FIG. 3, and the flanged roller 25a comes off from the posterior rim of the disk DI. In addition, the cam pin 46a of the link lever 46 is pushed by the slant portion 44c of the cam groove 44 to slightly rotate the link lever 46 in the clockwise direction of FIG. 4. Therefore, the disk supporting arm 24 rotates slightly in the counter-clockwise direction of FIG. 3, and the holder 24a comes off from the anterior rim of the disk DI.

As shown in FIG. 9B, when the lift frame 11 is put in the read/write position, the lifting pin 29a resides in the higher portion 65c. In the higher portion 65c is formed the pin pushing portion 66 that serves as the cam groove bottom wall 65c₁. Since the pin pushing portion 66 is pushed upward by the coil spring 70, the lifting pin 29a is pressed to the cam groove top wall 65c₂. Accordingly, the lift frame 11 becomes stable and hardly jerks.

Figure 8D:
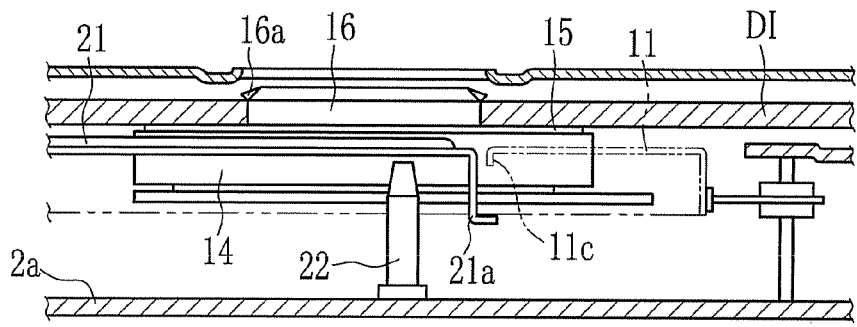

In addition, as shown in FIG. 8D, while the lift frame 11 is in the read/write position, the disk guide piece 21 is free from both the bent edge portion 11c and the chuck release pin 22. The disk guide piece 21 is therefore located below the turntable 15, and away from the bottom of the disk DI.

When the lift frame 11 reaches the read/write position, the loading motor 38 stops, and the spindle motor 14 starts rotating with the disk DI at high speed. In this state, the thread motor 34 rotates to move the carriage 19 along the guide shafts 32, 33. While moving in the radius direction of the disk DI, the optical pickup 20 on the carriage 19 reads or writes data.

To stop the data read/write operation, the push button 4 is operated. When the push button 4 is pressed, the spindle motor 14 stops and the thread motor 34 rotates in the reverse direction to put the carriage 19 back in an initial position. Then, the loading motor 38 starts rotating in the reverse direction to activate the disk loading mechanism 40, which now acts inversely to the carry-in operation of the disk DI.

Firstly, the loading slider 41 moves backward toward the bezel 3, and the follower slider 52 slides in the right direction of FIG. 4. The movement of the loading slider 41 causes the disk supporting arm 24 and the drawing arm 25 to rotate slightly and hold the rim of the disk DI. Thereafter, by the loading slider 41 and the follower slider 52, the lift frame 11 is once moved to the upper-most position shown in FIG. 8C, and delivered to the lower-most position shown in FIG. 8A via the read/write position shown in FIG. 8D.

While the lift frame 11 is descending, the disk guide piece 21 makes contact with the chuck release pin 22. When the lift frame 11 further descends, the disk guide piece 21 receives the bottom of the disk DI to prevent descending. The chucking head 16 keeps descending with the lift frame 11, and the chucking jaws 16a are pushed inward to release the chucking head 16 from the disk DI. As the lift frame 11 further descends, the bent portion 21a of the disk guide piece 21 is pushed down by the bent edge portion 11c of the lift frame 11, and as shown in FIG. 8A, the disk guide piece 21 curves upward.

When the lift frame 11 reaches the lower-most position, the follower slider 52 stops but the loading slider 41 keeps moving backward. The loading slider 41 turns the disk supporting arm 24 and the drawing arm 25 which hold and deliver the disk DI to the eject position shown in FIG. 4. When the disk DI is ejected, the switch 59 turns off to stop the loading motor 38, and the disk loading mechanism 40 ends the carry-out operation.

Figure 10:
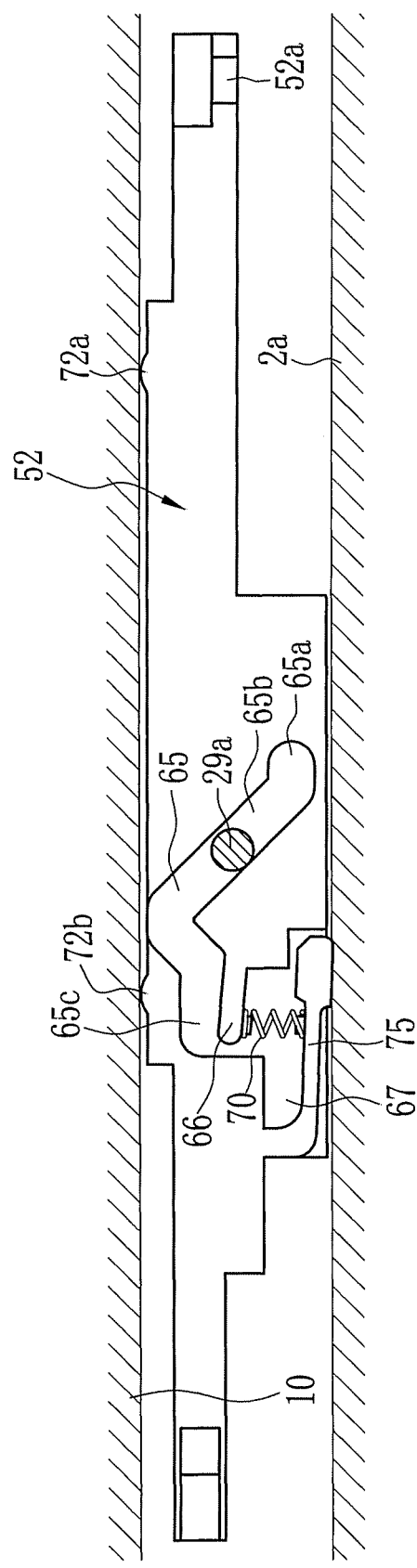
FIG. 10 is an explanatory view of an embodiment in which a pressing member is integrated with the slider.

Another embodiment is shown in FIG. 10, in which the same components as in FIG. 9 are designated by the same reference numerals. In this embodiment, a pressing member 75 is integrated with the follower slider 52.

Figure 11:
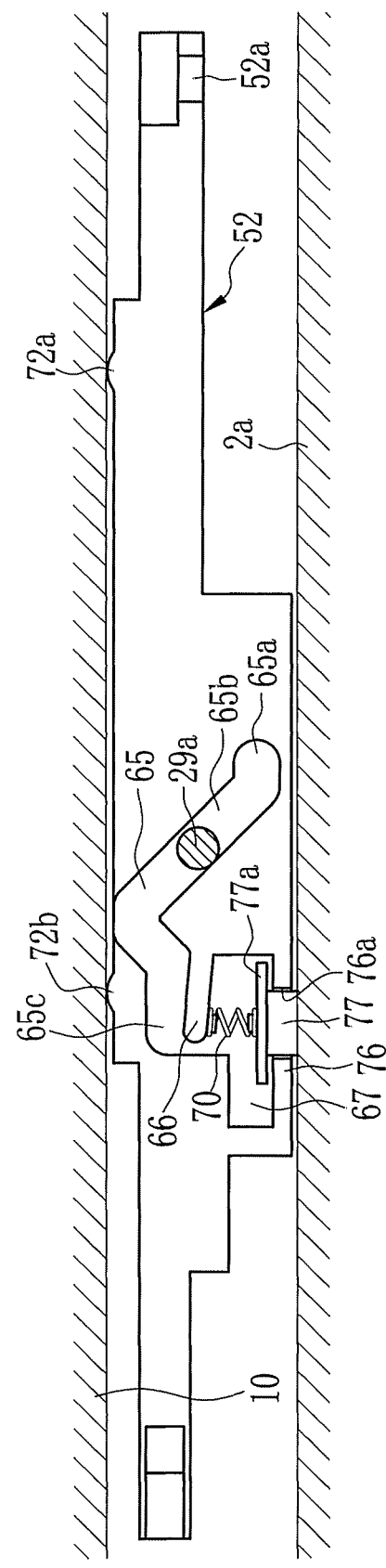
FIG. 11 is an explanatory view of an embodiment in which the pressing member moves up and down to the slider.

Still another embodiment is shown in FIG. 11. In this embodiment, a plate portion 76 is formed below the cutout 67. The plate portion 76 has a square opening 76a into which a pressing member 77 is inserted. A reference numeral 77a designates a retaining flange.

While in the above embodiments the pressing member is pressed to the bottom plate 2a, it is possible to turn the slider up side down and force the pressing member onto the bottom surface of the base panel 10.

In addition, the pin pushing portion may be formed in the loading slider. Further, the present invention is applicable to the tray type disk devices as well.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk device including a slider configured to slide on a surface, and a lift frame configured to support a turntable to hold and rotate a disk, said lift frame having a lifting pin fit into a cam groove provided on the slider and said lift frame being lifted from a lower-most position in conjuction with slide movement of said slider, so as to attach said disk to said turntable, and then being put in a read/write position, said disk device comprising:

a pressing member provided on said slider;

a resilient pin pushing portion constituting a cam wall of said groove in the area where said lift frame is put in said read/write position; and a spring, located between said resilient pin pushing portion and said resilient pin pushing portion to press said lifting pin to an opposite cam wall of said cam groove.

2. The disk device of claim 1, wherein said surface is a bottom plate surface of a device chassis.

3. The disk device of claim 1, wherein said pressing member is rotatably attached to said slider.

4. The disk device of claim 3, wherein said pressing member has a plate-like shape with a shaft hole, which ratably fits onto a shaft formed on said slider.

5. The disk device of claim 1, wherein said pressing member is integrated with said slider.

6. The disk device of claim 5, wherein said pressing member is a projection having an L-shaped cross section.

7. The device of claim 1, wherein said pressing member is attached to said slider and movable up and down with respect to said slider.

8. The disk device of claim 7, wherein said pressing member includes a columnar portion and a retaining flange on said columnar portion, and said columnar portion projecting from an opening on a bottom of said slider.

* * * * *

UNITED STATES PATENT AND TRADEMARK OFFICE
CERTIFICATE OF CORRECTION

| | | |
|---|---|---|
| PATENT NO. | : 8,752,076 B2 | Page 1 of 1 |
| APPLICATION NO. | : 12/050095 | |
| DATED | : June 10, 2014 | |
| INVENTOR(S) | : Shinichi Fujisawa | |

It is certified that error appears in the above-identified patent and that said Letters Patent is hereby corrected as shown below:

In the Claims:

Column 9, Line 2:
"said groove in the area where said lift frame is put in said" should read, --said cam groove in the area where said lift frame is put in said--.

Column 9, Line 5:
"and said resilient pin pushing portion to press said lifting" should read, --and said pressing member, for pressing said pressing member to said surface, and for biasing said resilient pin pushing portion to press said lifting--.

Column 9, Line 12:
"has a plate-like shape with a shaft hole, which ratably fits" should read, --has a plate-like shape with a shaft hole, which rotatably fits--.

Column 9, Line 18:
"7. The device of claim 1, wherein said pressing member is" should read, --7. The disk device of claim 1, wherein said pressing member is--.

Signed and Sealed this
Twenty-third Day of September, 2014

Michelle K. Lee
*Deputy Director of the United States Patent and Trademark Office*